Patented Mar. 3, 1953

2,630,422

UNITED STATES PATENT OFFICE 2,630,422

POLYMERIC POLYHYDROXY ESTERS AND METHOD FOR PRODUCING THE SAME

Merlin M. Brubaker, Chadds Ford, Pa., assignor to E. I. du Pont de Nemours and Company, Wilmington, Del., a corporation of Delaware No Drawing. Application November 22, 1949, Serial No. 128,922

8 Claims. (Cl. 260—63)

This invention relates to novel compositions of matter and to methods for their preparation. More particularly this invention provides new polyhydroxy esters and a method for preparing such new polyhydroxy esters by reduction of polymeric hydroxy keto esters. This invention is a continuation-in-part of my copending application S. N. 552,374, filed on September 1, 1944, wherein I have disclosed that carbon monoxide, upon polymerization in the presence of an ethylenic compound and an alcohol, yields products which can be hydrogenated to form corresponding polyhydroxy derivatives. The polymerization products are further described as polymeric hydroxy keto esters in my copending application S. N. 97,319, which was filed on June 4, 1949; the present application is also a continuation-in-part of the said application S. N. 97,319.

Certain polyhydroxy esters differing from those of the present invention have been known heretofore. For example, it has been disclosed recently in U. S. Patent 2,419,880 (Blyler et al.) that polymers containing both carboxyl and hydroxyl groups can be esterified by reaction with alcohols. Patents disclosing vinyl alcohol/methacrylic ester copolymers are U. S. 2,290,600 and 2,328,922 (Neher et al.). It has been reported in U. S. 2,067,706 (Fikentscher) that saponification of the product obtainable by interpolymerization of an acrylic acid ester and a vinyl ester yields a lactone type of product.

An object of this invention is to produce novel polymeric polyhydroxy esters having characteristic useful properties which differ from those of the previously known polymeric polyhydroxy esters. Another object is to provide a novel method for preparing polymeric polyhydroxy esters. Other objects of the invention will appear hereinafter.

In accordance with this invention, novel polymeric polyhydroxy esters are prepared by reacting hydrogen or a hydrogen generating substance with a polymeric hydroxy keto ester. In one of its embodiments the invention comprises preparing a polymeric polyhydroxy ester by hydrogenating a polymeric hydroxy keto ester in the presence of a hydrogenating catalyst. Preferably the hydrogenation of the polymeric hydroxy keto esters to polyhydroxy esters may be effected at temperatures in a range of 100° to 250° C. Because a satisfactory reaction rate, with minimum of side-reaction product formation, is obtained at 125° to 200° C., this range is the one within which the hydrogenation is generally effected, in most instances. The hydrogenation is generally effected under superatmospheric pressures, preferably pressures in the range of 100 to 20,000 pounds per square inch. Since better reaction rates, with minimum of side-reaction product formation, are obtained when the pressure is above 500 pounds per square inch, the use of such pressures constitutes a preferred mode of operation. Pressures above 20,000 pounds per square inch are not generally used because they have no practical advantages, but, on the contrary, increase operating costs and equipment requirements. While, in accordance with this invention, it is preferable to prepare the polymeric polyhydroxy esters by reacting hydrogen with a polymeric hydroxy keto ester in the presence of a hydrogenating catalyst, it is also possible to reduce polymeric hydroxy keto esters to polymeric hydroxy esters in accordance with this invention by the use of hydrogen donating substances, such as metal hydrides, e. g. lithium aluminum hydride, sodium aluminum hydride, etc. It is usually preferred to use these reagents at temperatures of about 20° to 250° C.

The examples which follow are submitted to illustrate and not to limit the invention.

*Example 1.*—A silver-lined autoclave, with a capacity of 0.4 liter, was charged with 80 parts of ethanol, 2 parts of barium-modified copper chromite catalyst, 1.5 parts of triethylamine and 5 parts of a polymeric hydroxy keto ester which had been prepared from ethylene, carbon monoxide and methanol and contained these components in the molar ratio 1:0.57:0.02, according to calculations based upon the results of elementary carbon and hydrogen analyses. This polymeric hydroxy keto ester had an inherent viscosity of 0.40 in chloroform solution, contained 1.8% methoxyl as determined by the Zeisel method, and was soluble in chloroform and in hot dioxane, but only slightly soluble in ethanol. The reaction mixture was heated to 150° C. for 19 hours while being subjected to a pressure of approximately 1000 atmospheres of hydrogen. Over the reaction period the pressure drop corresponding to absorption and reaction of hydrogen was 10 atmospheres.

The reaction mixture was filtered, and solvent was evaporated from the clear filtrate leaving 4 parts of a solid which was insoluble in chloroform but completely soluble in dioxane and ethanol. The carbon and hydrogen contents corresponded to reduction of at least 70% of the carbonyl groups of the original polymer. The infra red spectrum showed strong absorption in the hydroxyl region and weak carbonyl absorption. The methoxy content was 2.5% (Zeisel) and the polyhydroxy ester had an inherent viscosity of 0.15 in dimethylformamide solution.

Films of the polyhydroxy ester, prepared by pressing the polymer between plates heated to 140° C., were clear and pliable but not orientable.

*Example 2.*—Example 1 was repeated with a polymeric hydroxy keto ester from ethylene, carbon monoxide and methanol containing these components in the molar ratio 1/0.65/0.03. This hydroxy keto ester was an orientable polymer with an inherent viscosity of 1.1. It was soluble in chloroform and dioxane but very slightly soluble in ethanol, and contained 2.0% methoxyl. In 18⅔ hours at 150° C. and 980 atmospheres hydrogen pressure, the pressure drop was 5 atmospheres.

The reaction mixture was filtered, and the solvent was evaporated from the filtrate, leaving 3 parts of polymer which was insoluble in chloroform or dioxane but almost completely soluble in ethanol. The composition of the polyhydroxy ester indicated at least 94% reduction of the carbonyl groups, and the methoxyl content (Zeisel) was 2.3%. A film pressed from this polymer was orientable, with a tensile strength of 2800 pounds per square inch (324% elongation at break) and a bending modulus of 5800 pounds per square inch.

*Example 3.*—A solution of 25 parts of the hydroxy keto ester of Example 2 and 3000 parts of 1,4-dioxane was heated to 80° C. in a reaction vessel fitted with a dropping funnel, a stirrer and an efficient reflux condenser. To this solution was added over a period of 0.5 hour a solution of 20 parts of lithium aluminum hydride in 140 parts dry diethyl ether. The mixture was heated at 75° C. for 6 hours, during which time the reaction mixture first became so thick that it could scarcely be stirred but later thinned to a creamy consistency. It was then poured into a mixture of 3000 parts of ice and 30 parts of sulfuric acid and allowed to stand overnight. The polymer which separated was filtered off, washed with water, and air dried.

The composition corresponded to complete reduction of the carbonyl groups. Films of the polymer were clear, colorless, and orientable and had a tensile strength of 6000 pounds per square inch (235% elongation at break) and a bending modulus of 40,000 pounds per square inch.

*Example 4.*—A solution of 10 parts of polymeric hydroxy keto ester and 600 parts of 1,4-dioxane was heated to 70° C. in a reactor fitted with stirrer, dropping funnel and a reflux condenser. The keto ester was prepared from ethylene, carbon monoxide and methyl formate, and its composition corresponded to a molar ratio of

1:0.54:0.05 respectively, for these components. To this stirred solution was added, over a period of 0.5 hour, a solution of 5 parts of lithium aluminum hydride dissolved in 35 parts of diethyl ether. A heavy gel was formed initially which thinned to a cream. The mixture was heated and stirred for 6 hours at 70° C., then poured into a mixture of 1200 parts of ice and 10 parts of acetic acid. The solid which separated was washed with 1% acetic acid until it left no residue on ignition. It was then dried to obtain 9 parts of reduced polymer.

The composition of this polymeric hydroxy ester corresponded to 92% reduction.

The polymeric hydroxy keto esters used in the preparation of the polyhydroxy esters of this invention are the products obtained by polymerizing carbon monoxide with a polymerizable organic compound containing ethylenic unsaturation and an alcohol or an alkyl formate, in the presence of a catalyst of the kind which is effective for converting ethylene to solid polymers, as described in my copending application, Serial No. 552,374, filed September 1, 1944. In a typical preparation, a pressure reactor is charged with the alcohol or alkyl formate and catalyst, the reactor is deoxygenated either by evacuation or by sweeping it with oxygen-free nitrogen and then evacuating, and then charged with a mixture of carbon monoxide and a polymerizable organic compound. The reactor is closed and heated with agitation. The pressure within the reactor is maintained at the selected level by periodic injections of carbon monoxide, polymerizable organic compound, or a mixture of carbon monoxide with polymerizable organic compound. After reaction is complete the reactor is permitted to cool, the contents discharged, and the products isolated by fractional distillation or other method known to those skilled in the art. The example which follows illustrates the preparation of a specific polyhydroxy keto ester usefully employable in the preparation of the polyhydroxy esters of this invention.

A silver-lined pressure reactor is charged with 7.6 parts of a 60% solution of tertiary butyl hydroperoxide in tertiary butyl alcohol. The reactor is cooled and evacuated and then pressured to 1000 atmospheres at 130° C. with a gas mixture composed of 30% ethylene and 70% carbon monoxide. The reactor is shaken and maintained at the indicated temperature and pressure of 845 to 1000 atmospheres for 19 hours, during which time the pressure is maintained at the indicated level by periodically repressuring with ethylene/carbon monoxide mixed gas. Thereafter, the reactor is allowed to cool, opened, and the contents discharged. From the reaction mixture there are recovered 23 parts of a brown powder analyzing 63.59% carbon and 7.50% hydrogen. From this analysis it may be calculated that the amount of tertiary butyl alcohol combined in the polymer is 9%. Infrared analysis shows an absorption band in the spectrum at 2.9 microns, indicating the presence of hydroxyl groups in the polymer.

The polymeric hydroxy keto esters which are obtained by interpolymerization of a polymerizable organic compound with carbon monoxide in the presence of an alkanol or alkyl formate have the recurring unit

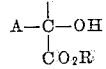

wherein A is the residue from the polymerizable organic compound and R is the non-hydroxyl portion of the alcohol or the alkyl portion of the alkyl formate. They also contain the group

in which A has the above indicated significance.

It is to be understood that in general reducing agents which are capable of reducing a ketone group to an alcoholic hydroxyl group may be employed in the reduction of polymeric hydroxy keto esters in accordance with this invention. Outstanding results are obtained, however, by hydrogenating polymeric hydroxy keto esters of the kind produced by interpolymerization of carbon monoxide with ethylene in the presence of an alkanol having from 1 to 4 carbon atoms per molecule, said hydrogenation being carried out in the presence of a solvent for the said interpolymer and in the presence also of a hydrogenating catalyst at a temperature within the range of 100° to 250° C. under superatmospheric pressure.

Although, in effecting the hydrogenation, any hydrogenating catalyst may be used, because of their unique selectivity and activity the preferred catalysts are the chromites of metals which form hydrogenating metal oxides. Particularly good results are obtained by using, as the catalyst, mixtures of chromites of metals which form hydrogenating metal oxides, at least one of which is difficultly reducible and another readily reducible. The preferred compositions comprise copper chromite associated with a lesser quantity of barium chromite or chromites of alkaline earth metals. Difficultly reducible oxides are those which remain, for the most part, in the oxide form after prolonged exposure in a pure state to hydrogen at atmospheric pressure and at a temperature of 400° C. Examples of such hydrogenating metal oxides are zinc, manganese, and magnesium. Readily reducible oxides are those, which, under the same conditions, are readily converted to the elementary metal and water vapor. Examples are the oxides of cadmium, copper, mercury, silver, tin, lead, bismuth, iron, nickel, and cobalt. Examples of suitable chromites are copper chromite, zinc cadmium chromite, copper barium chromite, copper cadmium barium chromite, lead zinc chromite, zinc manganese chromite, nickel chromite, cobalt chromite, iron chromite and the like. These chromites are conveniently made by igniting at its spontaneous decomposition temperature a multiple chromate of a metal forming a hydrogenating oxide with a nitrogen base, such as ammonia, as described in U. S. Patents 1,746,783 and 2,066,153. A typical preparation of a copper chromite catalyst is the following:

Fifteen hundred grams of copper nitrate, dissolved in 4 liters of water, was mixed with a soltuion containing 1000 grams of ammonium chromate in an equal volume of water. Ammonium hydroxide was added to neutralize the acidity developed during precipitation of the copper ammonium chromate. The precipitate was washed by decantation, filtered and dried, after which it was ignited at 400° C.

The preparation of a barium-modified copper chromite catalyst is illustrated below:

To a solution consisting of 52 grams of barium nitrate and 436 grams of copper nitrate trihydrate, dissolved in 1600 cc. of water, there is added with stirring a second solution of 252 grams of ammonium bichromate and 300 cc. of 28% ammonium hydroxide in 1200 cc. of water. The precipitate of mixed chromates is filtered, dried, and ignited at 400° C. for 4 hours. The resulting mixed chromites are extracted with dilute acetic acid, washed, dried, and powdered.

In place of the chromites other usefully employable catalysts are the metals of the ferrous metal groups, especially when they are extended on such inert supports as carbon, alumina, silica and the like.

The amount of catalyst is at least 1% by weight of the hydroxy keto ester being hydrogenated. Since the rate of hydrogenation seems to increase proportionately with the amount of catalyst employed, up to a certain limit, it is preferred to employ as large an amount of catalyst as is consistent with economy of operation. Usually amounts in the range of 10% to 40% by weight of the hydroxy keto ester are employed because within this range the best combination of product yield, reaction rate, and economy of operation is realized.

The presence of a small amount of a tertiary aliphatic amine functions as an activator for the hydrogenation catalyst. The use of such a tertiary aliphatic amine therefore constitutes a preferred mode of operation. The amount of tertiary aliphatic amine employed can be as low as one part per 10 parts of catalyst. As a rule, however, larger amounts of the order of equal parts are used because the best results are thereby obtained.

The reduction of the polymeric hydroxy keto ester is, in general, effected while the polymeric hydroxy keto ester is in the fluid condition, i. e., is either a liquid or is in solution in an inert organic solvent. Suitable solvents are alcohols, e. g., methyl, ethyl, and propyl alcohols, hydrocarbons, e. g., cyclohexane, methyl cyclohexane, gasoline and other saturated aliphatic hydrocarbons, ethers, e. g., diethyl ether, and the like, etc.

The polyhydroxy esters of this invention may also be prepared by reducing the corresponding polymeric hydroxy keto esters with a metal hydride. Suitable metal hydrides are lithium aluminum hydride, sodium aluminum hydride, and the like.

The polyhydroxy esters of this invention are useful for the preparation of adhesives, films, fibers, thermosetting resins (containing carboxyl and hydroxyl groups) etc.

What is claimed is:

1. A process for preparing polymeric hydroxy esters which comprises subjecting a polymeric hydroxy keto ester having hydroxy and carbalkoxy groups on the same carbon atom formed by interpolymerization of carbon monoxide with ethylene in the presence of an alkanol having from 1 to 4 carbon atoms per molecule to the action of a reducing agent capable of reducing ketone groups to alcoholic hydroxyl groups.

2. A process for preparing high molecular weight polyhydroxy esters which comprises hydrogenating a polymeric hydroxy keto ester having hydroxyl and carbalkoxy groups on the same carbon atom formed by interpolymerization of carbon monoxide with ethylene in the presence of an alkanol having from 1 to 4 carbon atoms per molecule, said hydrogenation being conducted in the presence of a solvent for the said polymeric hydroxy keto ester and in the presence also of a hydrogenating catalyst at a temperature within the range of 100° to 250° C. under superatmospheric pressure, and thereafter separating from the resulting mixture the polymeric polyhydroxy ester produced by the said hydrogenation.

3. The process of claim 2 in which the said solvent is 1,4-dioxane.

4. The process of claim 2 in which the said solvent is ethanol.

5. A process for preparing high molecular weight polymeric polyhydroxy esters which comprises hydrogenating a polymeric hydroxy keto ester having hydroxyl and carbalkoxy groups on the same carbon atom, said polymeric hydroxy keto ester being characterized in that it is produced by interpolymerization of carbon monoxide with ethylene in the presence of methanol, said hydrogenation being conducted in the presence of a hydrogenating catalyst at a temperature within the range of 125° to 200° C. and under a pressure within the range of 100 to 20,000 pounds per square inch, and thereafter separating from the resulting mixture the polymeric polyhydroxy ester produced by the said hydrogenation.

6. A process for preparing high molecular weight polymeric polyhydroxy esters which comprises hydrogenating a polymeric hydroxy keto ester having hydroxyl and carbalkoxy groups on the same carbon atom, said polymeric hydroxy keto ester being characterized in that it is produced by interpolymerization of carbon monoxide with ethylene in the presence of methanol, said hydrogenation being conducted in the presence of a hydrogenating catalyst at a temperature within the range of 125° to 200° C. and under a pressure within the range of 500 to 20,000 pounds per square inch, and thereafter separating from the resulting mixture the polymeric polyhydroxy ester produced by the said hydrogenation.

7. The process of claim 4 in which the said hydrogenating catalyst is barium-modified copper chromite.

8. A polymeric polyhydroxy ester characterized in that it is a hydrogenation product of a polymeric hydroxy keto ester having hydroxyl and carbalkoxy groups on the same carbon atom formed by interpolymerization of ethylene with carbon monoxide and an alkanol having from 1 to 4 carbon atoms, and further characterized in that the keto groups in the said polymeric hydroxy keto ester have been reduced to hydroxyl groups.

MERLIN M. BRUBAKER.

REFERENCES CITED

The following references are of record in the file of this patent:

UNITED STATES PATENTS

| Number | Name | Date |
| --- | --- | --- |
| 2,145,354 | Dreyfus | Jan. 31, 1939 |
| 2,388,600 | Collins | Nov. 6, 1945 |
| 2,495,286 | Brubaker | Jan. 24, 1950 |
| 2,495,292 | Scott | Jan. 24, 1950 |

OTHER REFERENCES

Lucas: "Organic Chemistry," pages 241, 242 (American Book Co.) (1935).

Whitmore: "Organic Chemistry," (1937), pages 438–9.